United States Patent [19]

Streater

[11] Patent Number: 5,781,196
[45] Date of Patent: Jul. 14, 1998

[54] VIDEO COMPRESSION BY EXTRACTING PIXEL CHANGES EXCEEDING THRESHOLDS

[75] Inventor: Stephen B. Streater, London, United Kingdom

[73] Assignee: Eidos PLC of the Boat House, Middlesex, United Kingdom

[21] Appl. No.: 779,150

[22] Filed: Jan. 3, 1997

Related U.S. Application Data

[63] Continuation of Ser. No. 591,396, Jan. 25, 1996, abandoned, which is a continuation of Ser. No. 39,342, PCT/GB91/01832, filed Oct. 18, 1991, abandoned.

[30] Foreign Application Priority Data

Oct. 19, 1990 [GB] United Kingdom ............ 9022761

[51] Int. Cl.$^6$ ............................................. H04N 7/12
[52] U.S. Cl. ............................................. 345/428
[58] Field of Search ............... 395/118; 358/427, 358/428, 525; 348/390, 401; 382/166; 345/428

[56] References Cited

U.S. PATENT DOCUMENTS

| | | | |
|---|---|---|---|
| 3,679,821 | 7/1972 | Schroeder | 348/401 |
| 4,409,623 | 10/1983 | Kobayashi et al. | 358/427 X |
| 4,468,708 | 8/1984 | Coleman | 386/33 |
| 4,654,484 | 3/1987 | Reiffel et al. | 348/17 |
| 4,673,977 | 6/1987 | Stelzenmuller | 348/396 |
| 4,785,349 | 11/1988 | Keith et al. | 348/390 |
| 4,796,085 | 1/1989 | Shinada | 358/525 |
| 4,868,653 | 9/1989 | Golin et al. | 348/390 |
| 4,958,226 | 9/1990 | Haskell et al. | 348/401 X |
| 4,979,049 | 12/1990 | Chamzas et al. | 358/426 |
| 4,982,282 | 1/1991 | Saito et al. | 358/427 X |
| 5,040,233 | 8/1991 | Davy et al. | 382/239 |
| 5,046,119 | 9/1991 | Hoffert et al. | 382/166 |
| 5,063,608 | 11/1991 | Siegel | 382/239 |
| 5,067,015 | 11/1991 | Combridge et al. | 348/398 |
| 5,068,723 | 11/1991 | Dixit et al. | 348/420 |
| 5,121,202 | 6/1992 | Tanoi | 348/416 |
| 5,122,873 | 6/1992 | Golin | 348/390 |
| 5,130,786 | 7/1992 | Murata et al. | 348/390 X |
| 5,134,476 | 7/1992 | Aravind et al. | 348/390 X |
| 5,136,396 | 8/1992 | Kato et al. | 358/428 X |
| 5,150,209 | 9/1992 | Baker et al. | 348/407 |
| 5,161,001 | 11/1992 | Pele et al. | 348/390 X |
| 5,228,098 | 7/1993 | Crinin et al. | 382/240 |

FOREIGN PATENT DOCUMENTS 0070677 1/1983 European Pat. Off. ......... H04N 1/46

OTHER PUBLICATIONS

Pratt, Digital Image Processing, 1978, pp. 589, 616 to 661.

*Primary Examiner*—Anton Fetting
*Attorney, Agent, or Firm*—Sughrue, Mion, Zinn, Macpeak & Seas, PLLC

[57] ABSTRACT

A video processing system employs a microcomputer 11 which functions to effecting real-time on-screen functions on original video images for storage on an optical disc 28. The system employs an adaptive program which extracts visual image data from a digitizer 15 and compresses this data for the real-time processing to create dynamically an optimal sub-set of pixels of the original image.

23 Claims, 3 Drawing Sheets

VIDEO COMPRESSION BY EXTRACTING PIXEL CHANGES EXCEEDING THRESHOLDS

This is a continuation of application Ser. No. 08/591,396 filed Jan. 25, 1996, now abandoned, which is a continuation of application Ser. No. 08/039,342, filed as PCT/GB91/01832 filed Oct. 18, 1991, now abandoned.

TECHNICAL FIELD

The present invention relates to a video processing system and a method of processing signals for use, for example, in real time editing of video images and signals.

BACKGROUND TO THE INVENTION

Hitherto the editing of video images has involved the use of expensive and sophisticated studio equipment and it has not been possible to effect off-line editing of video images even with sub-broadcast quality with low cost microcomputers.

A general object of the invention is to provide a video system fulfilling this need and employing one or more such microcomputers as well as methods of controlling and processing digital signals therein.

DISCLOSURE OF THE INVENTION

In one aspect the invention provides a video processing system comprising a video source, such as a video tape reproduction machine, a microcomputer, a large capacity storage medium, such as an optical disc, for storing video digital data representing coloured visual and sound images, at least one conversion means, such as a digitiser, for converting signals from the source into digital signals, and means for extracting selected digital signals derived from the conversion means and for compressing and converting the selected signals into an adapted format in real time up to and including broadcast tv frame rates for processing within the computer for storage on the storage medium.

In a practical realization of the system two microcomputers are used one serving to process audio signals and one to process video signals as aforesaid.

The means for extracting, compressing and converting the signals can operate on a frame by frame basis with information taken to represent each frame. This means can be embodied as an algorithm represented by software or hardware or a mixture of both. As appears hereinafter the means can be visualized, at least in conceptual terms, as: means for storing data and stored data representing a skeleton screen, an interpolate screen a skeleton list and a detail list. The skeleton screen is initially a low resolution subset of an original image representing one video colour field or frame and is derived by selecting one pixel in a group of say sixteen pixels to represent that entire group. The algorithm includes a function which detects when there is some change in corresponding pixels in successive image frames. Whenever some area of the image is identified in which changes are occurring then additional data is identified using the skeleton list and is then transferred and stored. The skeleton list represents at least some of the pixels judged to have changed significantly. The detail list represents all the pixels of the original image which have been extracted. The interpolate screen data is created from the original image to simulate the best possible compressed low resolution version of the original image. This data can be modified to create many real time editing effects such as cuts, mixes, DVEs captions and keys when the system is used for editing.

The invention also provides a method of extracting, compressing and converting digital information in an adapted format for processing in real time within a memory of a microcomputer for video editing purposes and for storage on a storage medium which may be removable and rewritable; said method comprising creating information representing a skeleton screen as a subset of digital signals representing an original colour image of pixels present in an analogue to digital conversion means, comparing information representing each pixel with the corresponding pixel in a preceding frame of the original image to detect a significant change, creating information representing a skeleton list of the addresses and description of any pixels which are judged to have changed significantly, creating information representing an interpolate screen from the original image as the best available low resolution version of the original image, transferring additional detail information pertaining to the pixels judged to have changed significantly and, if possible, neighbouring pixels thereof in one or more subsequent time periods and repeating this sequence to ensure the data for storage is the best available compressed sub-set of the pixels of the original image.

In a practical realization of this technique the interpolate screen is a 40 * 32 or more preferably a 80 * 48 pixel array. Each pixel may have 12 bit colour definition information.

In transferring information from the converter means or digitiser the method further adopts a filtering technique as set out hereinafter.

Preferably the method also involves additionally loading and storing the detail of every nth pixel (e.g. every 111th pixel for a 40 * 32 pixel array) from the subset of each of at least some of the fields or frames regardless of change.

The invention may be understood more readily, and various other aspects and features of the invention may become apparent, from consideration of the following description.

BRIEF DESCRIPTION OF THE DRAWINGS

Embodiments of the invention will now be described by way of examples only, with reference to the accompanying drawings wherein.

BEST MODES OF CARRYING OUT THE INVENTION

Figure 1:
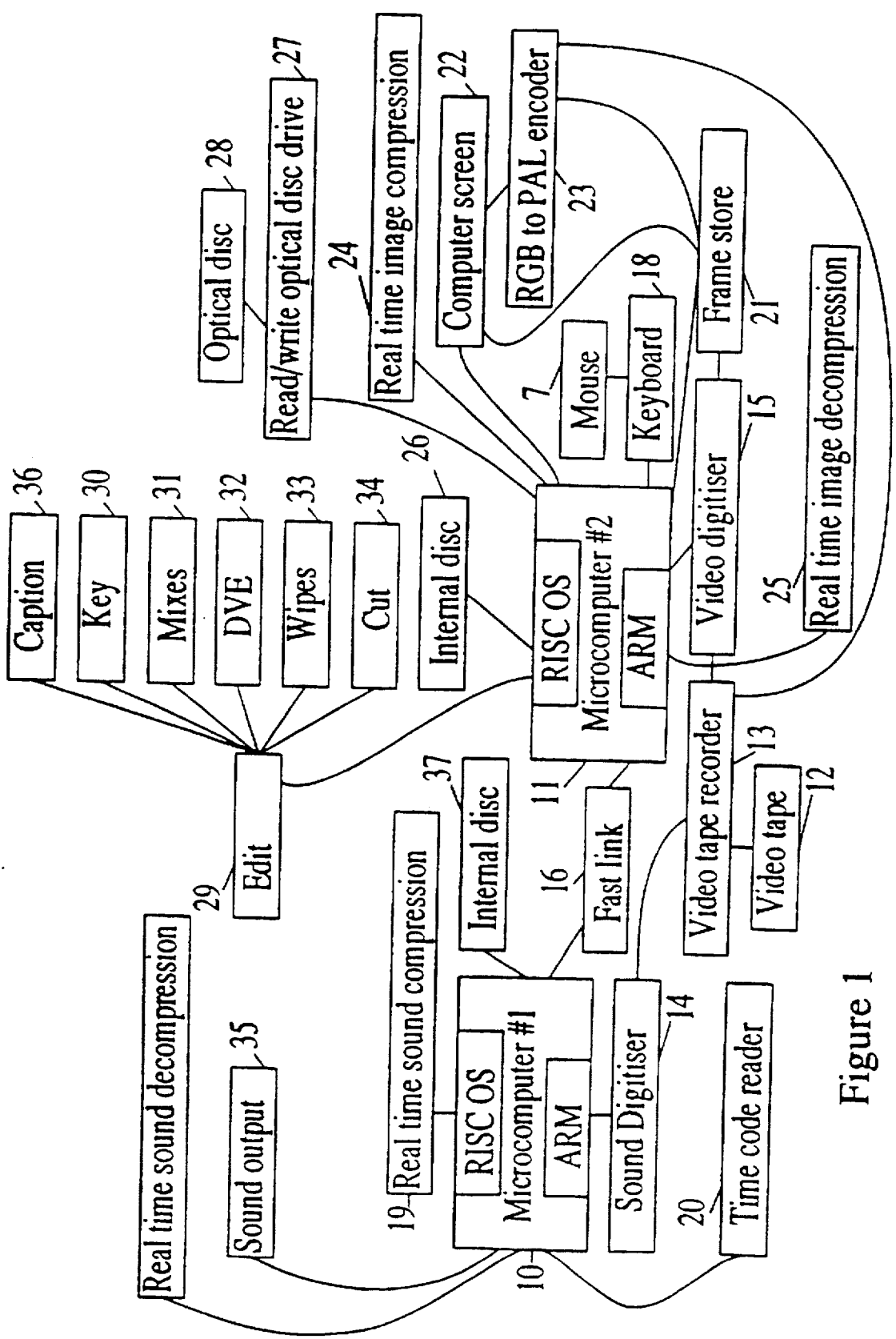
FIG. 1 is a block schematic diagram of a video processing system constructed in accordance with the invention.

In FIG. 1, the various blocks represent hardware or software or more usually a mixture of these and the lines connecting the blocks are a simplified representation of the main signal information flow paths. As shown, the video processing system employs two proprietary microcomputers 10, 11 preferably PCs utilizing 'Reduced Instruction Set Computer' (RISC) operating architecture such as 'Archimedes' designed and marketing by Acorn Computers Limited (UK). Video tape 12 to be processed, e.g. edited, by the system is inserted into a video tape recorder 13 in the play back mode and the recorder 13 provides analogue signals to separate audio and visual image analogue to digital converters or digitisers 14, 15. The digitiser 14, feeds the microcomputer 10 and the digitiser 15 feeds the microcomputer 11 via a frame store 21.

There is a fast data transfer link 16 between the microcomputers 10, 11. The microcomputer 11 provides the main control functions with the aid of a mouse 7 and a keyboard 18 and images from the frame store 21 are displayed on a screen 22. After encoding to the PAL format in an encoder 23 video information can be recorded back onto the video tape 12 via the recorder 13 if desired.

Figure 2:
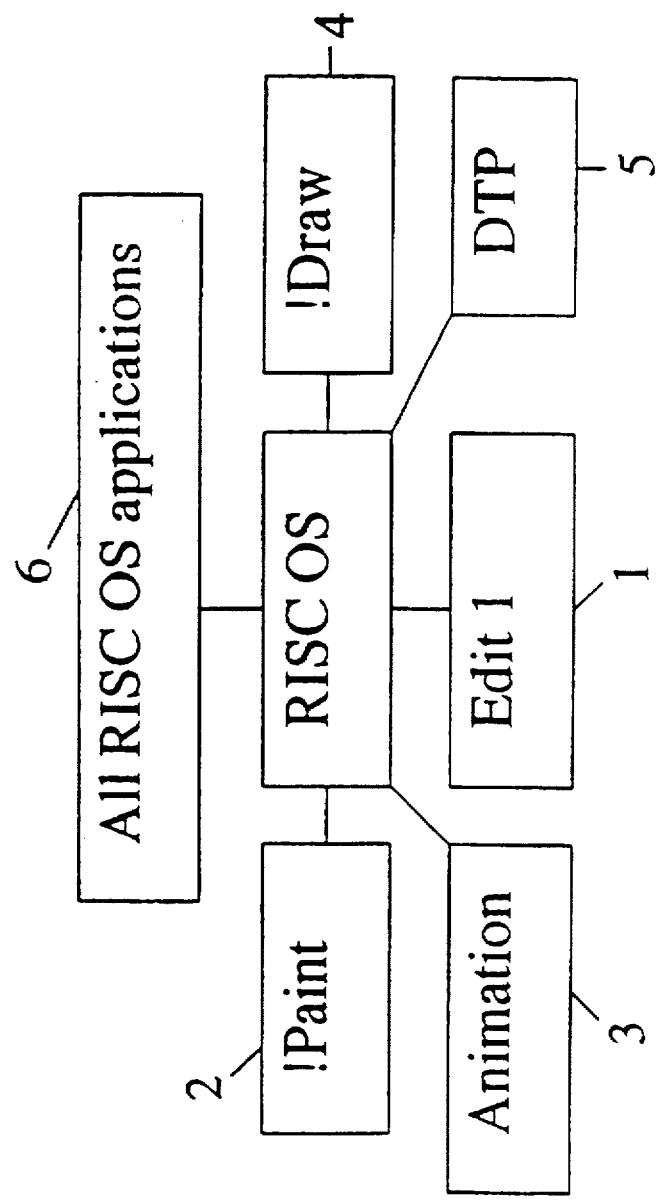
FIG. 2 is a further block diagram depicting another system in accordance with the invention.

The microcomputer 11 has an internal storage disc 26 and performs real time visual image compression at 24 and conversely real time visual decompression at 25. A read/write optical disc drive 27 is used to transfer data representing edited visual and audio information from the microcomputer 11 to an optical disc 28 e.g. a disc capable of storing 600MB representing about 1 to 2 hours of video playing time. The microcomputer 11 is adapted to perform various editing functions as indicated by the box 29 and the boxes 30–34 and 36. The options as generally described may be part (designated 1) of an overall system depicted in FIG. 2 where other functions are designated with boxes 2 to 6 and the overall system utilizes the "Risc operating system".

The system as described in connection with FIG. 1 needs to extract data efficiently from the frame store 21 and without special adapted data extraction and compression and conversion techniques of some sort, for example as will now be described it would not be possible with a low cost PC to download and process sufficient data from every frame of a full video image sequence. A typical frame has a resolution of x (640 pixels) and y (512 pixels) with 16 bits per pixel so a store needs a capacity of 320K for each field of the frame. With the PAL format there are 25 frames per second giving an equivalent total data transfer rate of about 16 Mbytes per second. With a low cost PC there is simply not enough external data bus bandwidth to enable video image sequences to be downloaded and stored let alone processed as well. Normally reading one pixel from the digitiser 15 is very slow-typically 1500n secs as compared with a typical access time to the main memory of 333n secs and to a cache memory of 33n secs.

In accordance with the invention, an algorithm is proposed which may be termed a 'grabbing' algorithm which enables the main computer 11 to choose only the important data in the digitiser 15 for downloading. Typical video images do not undergo much change frame to frame i.e. in 1/25 second and it is quite efficient to compare the current frame with a previous frame and to detect changes. The data transfer must take place in real time and must thereafter involve compression and the algorithm has at the most 1/50 second to extract the key information which is needed. Only a proportion of pixels are actually downloaded from the digitiser 15.

The compressed frame resolution which can be achieved with the invention is 160 by 128 pixels and up to 12 bits of information per coloured pixel.

Figure 3:
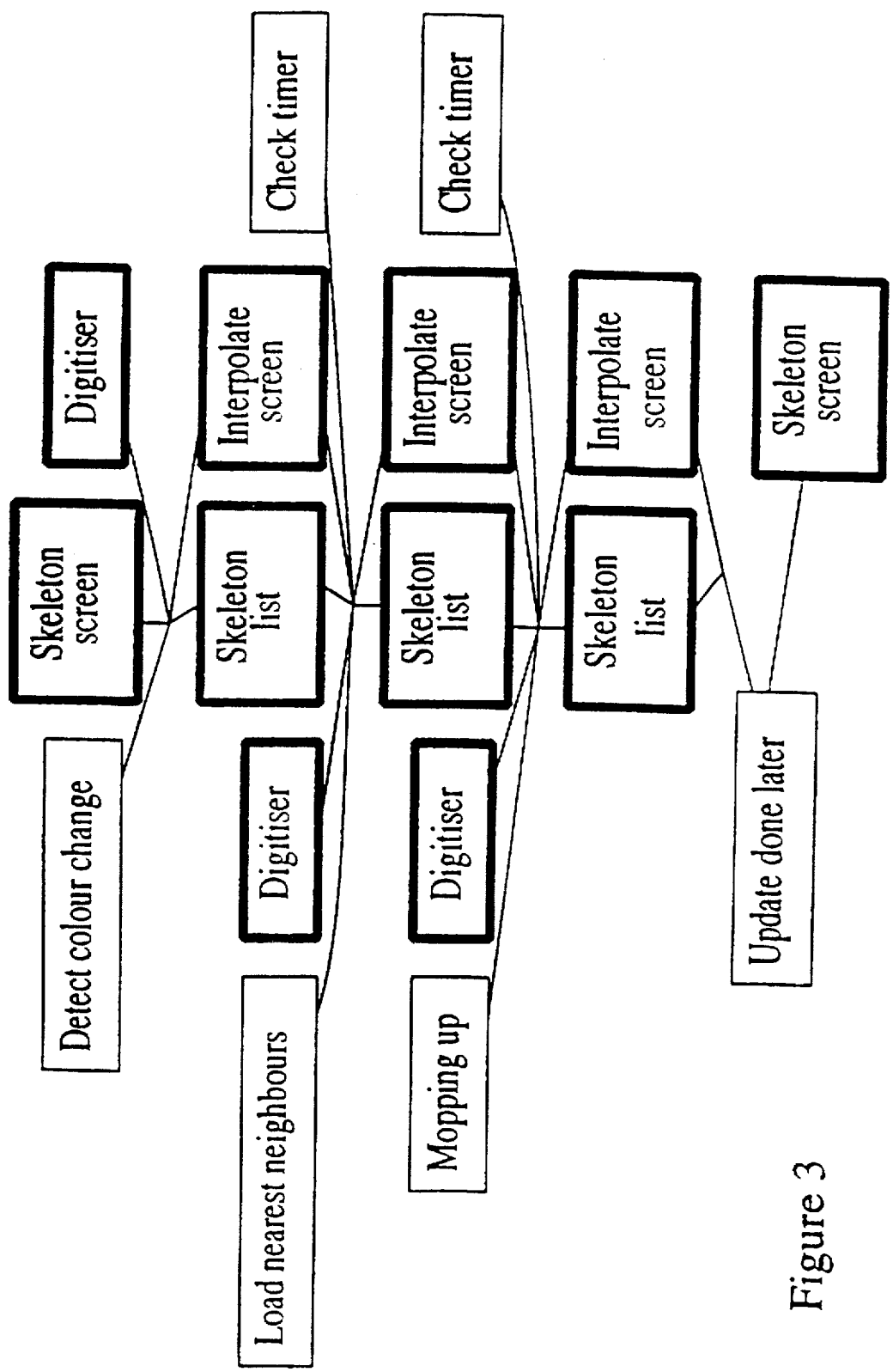
FIG. 3 is a block schematic diagram depicting a method of extracting data from the digitiser in accordance with the invention and as used in the systems shown in FIGS. 1 and 2.

FIG. 3 is a pictorial representation of the features of the control operation involving the algorithm which can be thought of as means for storing data and stored data representing a skeleton screen, an interpolate screen, a skeleton list and detail list. These 'screens' do not necessarily exist in reality but data or information representing these functions would exist from time to time in workspace arrays of the memory of the computer 11. There is also a notional main screen which represents an image frame with 160 * 128 pixels taken from the digitiser 15 which is the best available approximation to the original image after all the processing.

The skeleton screen can be derived by selecting each top left pixel from a group composed of a block of 4 * 4 adjacent pixels from the original image to form a 40 * 32 subset. The skeleton screen at this stage is thus simply a low resolution approximation of the current image frame. However, by comparing each pixel in the skeleton screen with a corresponding pixel in the preceding frame of the original image to detect where significant changes have occurred the system can be controlled to transfer data from areas of the image where more detail is required. In other words the skeleton screen is dynamically assessed in real time to detect areas where changes are occurring and where further data is judged to be needed. This further data is also downloaded from the store 21 of the digitiser 15 in a subsequent cycle. The additional data transferred in this manner is not yet part of the data representing the skeleton screen; instead a skeleton list is created to represent the pixels judged to have changed significantly and the equivalent data is downloaded if and when time permits. There is also a detail list (not shown) which is a full list of all the pixels loaded from the store 21 of the digitiser 15 in one phase of operation and thus each group of 16 pixels in the detail list has an equivalent of a single pixel in the skeleton screen. The interpolate screen is again a 40 * 32 pixel subset of the 160 * 128 image on the notional main screen but the interpolate screen is derived under the control of the algorithm always to represent the best available 40 * 32 compressed version of the image.

The grabbing algorithm and the equivalent control operations function as follows with reference to FIG. 3 where time flows downwards and each row corresponds to a step in the algorithm.

1. Set a spare 2 MHZ timer on the IOC support chip in the computer 11 to Hex FFFF and initiate the timer to count down.

2. Load each skeleton pixel from the frame store 21 of the digitiser 15 in turn. Since there is inevitably noise in the signals there is preferably a filtering technique as follows:

If the new pixel is $P_n$ and the old pixel is $P_o$ then the pixel added to the list is $U(P_n, P_o)$ where $U(x,y)=$ x if any RGB component of $P_n$<the corresponding component of $P_o$, or x if any RGB component of $P_n$>=the corresponding component of $P_o$+too_bright, or x if 'intensity' of $P_n$<'intensity' of $P_o$, or x if 'intensity' of $P_n$>='intensity' of $P_o$+grey_too_bright, or y otherwise, too_bright depends on the noise level, and is currently set to 3. grey_too_bright is currently 1½. 'intensity' ¼ (red value+2* green value+ blue value).

3. Compare each newly constructed filtered skeleton pixel with the preceding skeleton pixel. If these differ then:

i) Set the done flag in the new pixel.

ii) Update the list of skeleton pixels with the new pixel, its address and the detail flag set; and iii) Update the interpolate skeleton screen with the new pixel, its address and the done flag set.

Repeat this sequence until all the skeleton pixels which have changed significantly are on the skeleton list and put a terminate symbol at the end of the skeleton list. Download as much of the further data (detail) on the significant pixels as time permits (e.g. timer is bigger than Hex 6400).

4. If there is time available then work through the list of changed pixels until time or the changed pixels run out adding their neighbours to the skeleton list as well and their detail to the detail list. Any edge pixels do not have the neighbouring detail loaded off in view of the likely noise at the edges of the screen.

5. If there is still time available, load off the detail associated with every 111th skeleton pixel. This mopping up operation will eventually tidy up any pixels left out by the earlier phases since 111 is coprime with 40 * 32. A record is kept of the last block of pixels downloaded in this manner and the next time the routine occurs the mopping up operation will start where it left off previously. By choosing the 111th pixel the pixels appear to be loaded randomly rather than with any particular order on the screen thus reducing artifacts.

6. The detail list is terminated once the skeleton pixels have been downloaded in this manner. The end of the detail list pointer and the end of the skeleton list pointer are then stored and any miscellaneous tasks such as recording the elapsed time and counting the skeleton pixels can be performed at this stage.

7. Finally, the skeleton screen is updated from the skeleton list while the next field is being grabbed by the digitiser 15.

The data represented by the pixels of the skeleton list and detail list is compressed with a compression algorithm to provide the main screen which may involve the following steps.

1. Store one pixel of colour information for each pixel of the of the skeleton list while all detail list pixels are represented as intensities only.

2. Compress all the stored grabbed pixel information in a loss free manner by the known Huffman technique (all pixels since there is not sufficient time to compare a current pixel with a previous frame) except that any skeleton which is judged to be worth maintaining by the grabbing algorithm is not compressed. In the implementation of such compression the pixels between the skeleton pixels are estimated by interpolation of the skeleton pixels and the differences between the intensities of these interpolated estimates and the actual details pixels is Huffman compressed.

In an alternative grabbing algorithm a finer resolution of 80 * 48 pixels is achieved and there are six detailed pixels per skeleton pixel instead of 16. In this modified technique:

1) a pixel is added to the skeleton list of FIG. 3 if
   a) its intensity has varied by >i grey scale compared with the previous frame or
   b) its red component has varied by >r compared with the previous frame or
   c) if a) or b) is or has been applied to a neighbouring pixel in the previous frame where i and r are integers use to control quality and compression rates and are sufficiently large to preclude random noise effects. In on implementation i and r are 1. The test b) has been found to provide more accurate red components leading to better quality reproduction of skin and lipsync.

The assessment of what are neighbouring pixels for test c) can be left to the compression phase in order to free more time during the grabbing phase.

2) If the pixels in a skeleton block of 2 * 3 pixels consisting of one skeleton pixel(S) and five detail pixels (D1–D5) have the following relative positions:

|    |    |
|----|----|
| D1 | D2 |
| S  | D3 |
| D4 | D5 | then when the skeleton list is made all the "S" pixels must have been grabbed and the remaining pixels are grabbed in an order to assure information is spread throughout the blocks particularly if time runs out before all the detail pixels have been grabbed. The following order is one example: D2 D5 D4 D1 D3 (i.e. all the D2's are grabbed first then the D5's etc). This is repeated until all the required detail has been grabbed or time runs out.

To achieve extra speed in decompression there is no interpolation between the blocks.

During the subsequent compression phase the neighbours of the pixels grabbed under step 1) above are calculated and the following steps are carried out:

1) Convert all the new detailed lists after step 2) of the grabbing phase into intensities.

2) Store colour information for each grabbed block representing a skeleton.

3) Store intensity information only for the grabbed pixels D1–D5.

4) Effect Huffmann compression on the difference in intensity of each pixel and the intensity of the skeleton in its block so that 4 bits intensity information is compressed on average to between 2 and 3 bits.

5) Store the number of detail pixels grabbed in each block for each frame.

For every key sparsity, typically 25 frames, the entire current best estimate of the frame is compressed to allow easy access to the video sequence using a similar format except that every skeleton block contains a counter for the number of pixels in the block which have been grabbed.

I claim:

1. A video processing system comprising a video source, at least one microcomputer, a large capacity storage medium for storing video digital data at least representing coloured visual images; at least one conversion means for converting signals from the source into digital signals and means for selecting digital signals from the conversion means and for compressing and converting the selected signals in real time for processing within the microcomputer for storage on the storage medium, wherein the means for compressing and converting the selected digital signals comprises;

(a) means for creating first information representing a skeleton screen which is a low-resolution subset of digital signals representing an original colour image composed of pixels present in the conversion means, (b) means for comparing second information derived from said first information and representing each pixel of the skeleton screen with that of a corresponding pixel in a frame of a skeleton screen of an original image which immediately precedes a current frame from which the skeleton screen pixel information is derived to detect a change outside a pre-determined range of values, (c) means for creating third information representing a list of pixels which are judged to have changed significantly by being outside said pre-determined range of values, (d) means for creating from said first, second and third information further information representing an interpolate screen which is a compressed sub-set of digital signals of the original image as the optimum low resolution version of the original image of the current frame, (e) means for transferring additional high resolution information pertaining to: first, the pixels adjacent to any pixel judged to have changed significantly and second, pertaining to blocks of pixels neighboring any pixel judged to have changed to supplement the first information representing the skeleton screen in one or more subsequent time periods, and (f) means for causing the creating, comparing and transferring means to repeat their operation to ensure the data for storage is an optimum compressed sub-set of the pixels of the original image.

2. A system according to claim 1, wherein the further information represents an array of 40 horizontal pixels by 32 vertical pixels or 80 horizontal pixels by 48 vertical pixels.

3. A system according to claim 1, wherein the means for compressing and converting the selected digital signals further comprises means for storing chrominance value information of one pixel of one block of pixels in the first information and for storing all other pixels in the one block as luminance values only, and means for compressing the stored luminance and chrominance values representing pixels by the Huffmann technique.

4. A system according to claim 3, wherein the predetermined range of values is determined by assessing if:
   (a) the luminosity of a pixel has varied by greater than a value i compared with the corresponding pixel of the preceding frame, or
   (b) the red component of chrominance of the pixel has varied by greater than r compared with the corresponding pixel of the preceding frame, or
   (c) a) or b) has been applied to a neighbouring pixel in the preceding frame,
   where i is an integer representing a grey scale value, r is an integer, and i and r are sufficiently large to preclude random noise effects.

5. A system according to claim 4, wherein the means for creating the first information produces skeleton blocks of pixels, each block being composed of a group of two by three pixels and comprising one skeleton pixel (S) and additional frame detail pixels (D1–D5) with the following relative positions:

|    |    |
|----|----|
| D1 | D2 |
| S  | D3 |
| D4 | D5, | the information on the "S" pixels are all reproduced in the further information, and the information on the remaining detail pixels are taken in a predetermined order in repetitive cycles to ensure information on the detail pixels is spread out between blocks, and wherein the compression means calculates the neighbours of the pixels for step c) and converts the list information into luminance values, and the compression means further comprises means for storing chrominance value information for each block of pixels of the skeleton screen and luminance information for the detail pixels D1–D5, and means for carrying out the Huffmann compression technique on the difference in luminance for each pixel and the skeleton of its block.

6. A system according to claim 1, wherein the means for creating the first information produces skeleton blocks of pixels, each block being composed of a group of two by three pixels and comprising one skeleton pixel (S) and additional frame detail pixels (D1–D5) with the following relative positions:

|    |    |
|----|----|
| D1 | D2 |
| S  | D3 |
| D4 | D5, | the information on the "S" pixels are all reproduced in the further information, and the information on the remaining detail pixels are taken in a predetermined order in repetitive cycles to ensure information on the detail pixels is spread out between blocks.

7. A video processing system comprising a video source at least one microcomputer, a large capacity storage medium for storing video digital data at least representing coloured visual images, at least one conversion means for converting signals from the source into digital signals and means for selecting digital signals from the conversion means and for compressing and converting the selected signals in real time for processing within the microcomputer for storage on the storage medium, wherein the means for compressing and converting the selected digital signals comprises;
   (a) means for creating first stored data representing a skeleton screen which is a low resolution subset of digital signals representing an original image representing one video colour field or frame by selecting one pixel in a group of pixels of the original image to represent the entire group,
   (b) means for detecting a change in corresponding pixels in successive image fields or frame outside a predetermined range of values,
   (c) means for creating second stored data as a list whenever a significant change has been detected to represent at least some of the pixels which have been changed,
   (d) means for creating third stored data representing another list of all the pixels of the original image which have been selected at step (a), and
   (e) means for creating further stored data representing an interpolate screen from the first, second and third stored data which further data is a compressed sub-set of digital signals of the original image to produce a low resolution compressed version of the original image.

8. A method of selecting, compressing and converting digital information for processing in real time within a memory of a microcomputer for video editing purposes and for storage on a storage medium; said method comprising:
   (a) creating first information representing a skeleton screen which is a low-resolution subset of digital signals representing an original colour image composed of pixels present in an analogue to digital conversion means,
   (b) comparing second information derived from said first information and representing each pixel of the skeleton screen with that of a corresponding pixel in a frame of the original image which immediately precedes a current frame from which the skeleton screen pixel information is derived to detect a change outside a predetermined range of values,
   (c) creating from said first and second information further information representing a list of pixels which are judged to have changed significantly by being outside said predetermined range of values,
   (d) creating information representing an interpolate screen which is a compressed sub-set of digital signals of the original image of the current frame and a low resolution version of the original image of the current frame,
   (e) transferring additional high-resolution information pertaining to the pixels adjacent to any pixels judged to have changed significantly and pertaining to neighboring blocks of pixels thereof to supplement the first information representing the skeleton screen in one or more subsequent time periods, and
   (f) repeating sequence (a)–(e) to ensure the data for storage is an optimum compressed subset of the pixels of the original image.

9. A method according to claim 8, further comprising transferring high resolution information pertaining to some of the pixels selected on a random basis of at least some of the fields or frames for storage irrespective of change.

10. A grabbing computer algorithm for transferring video images over a data bus, the grabbing algorithm performing the steps of:

dividing each of a plurality of available video frames into groups of pixels and selecting one pixel, defined as a skeleton pixel, from each of the groups of pixels and independently of the other pixel from the group and adopting the selected pixels for each video frame so as to form a corresponding skeleton screen;

repeatedly transferring only skeleton pixels of video frames over the data bus, and comparing skeleton pixels of skeleton screens of successive video frames to detect changed skeleton pixels;

continuously monitoring the time remaining for operation on each current frame and, whenever remaining time permits, transferring over the data bus data relating to frame detail pixels, defined as pixels belonging to a group in which a skeleton pixel has been detected to have changed.

11. The grabbing computer algorithm of claim 10, wherein the data relating to frame detail pixels is grabbed according to a predetermined order.

12. The grabbing computer algorithm of claim 10, wherein when data relating to all the frame detail pixels have been transferred over the data bus, the algorithm further performs the steps comprising:

continuously monitoring the time remaining for operation on each current frame and, whenever remaining time permits, transferring over the data bus data relating to frame neighboring pixels, defined as pixels neighboring a group of pixels in which a skeleton pixel has been detected to have changed, but belonging to a group in which a skeleton pixel has been detected not to have changed.

13. The grabbing computer algorithm of claim 12, wherein the data relating to all the frame neighboring pixels is grabbed according to a predetermined order.

14. The grabbing computer algorithm of claim 12, wherein when data relating to all the frame neighboring pixels have been transferred over the data bus the algorithm further performs the steps comprising:

continuously monitoring the time remaining for operation on each current frame and, whenever remaining time permits, transferring over the data bus data relating to frame remaining pixels, defined as pixels of the current frame which have not been grabbed yet.

15. The grabbing computer algorithm of claim 14, wherein the data relating to the frame remaining pixels is transferred over the data bus according to a pseudo-random order.

16. A computer readable medium having a program stored therein, said program having directions to perform the steps comprising:

dividing each of a plurality of available video frames into groups of pixels and selecting one pixel, defined as a skeleton pixel, from each of the groups of pixels and independently of the other pixels of the group and adapting the selected pixels for each video frame so as to form a corresponding skeleton screen;

repeatedly transferring only skeleton pixels of video frames over the data bus, and comparing skeleton pixels of skeleton screens of successive video frames to detect changed skeleton pixels;

monitoring the time remaining for operation on each current frame and, when remaining time permits, transferring data relating to frame detail pixels, defined as pixels belonging to a group in which a skeleton pixel has been detected to have been changed.

17. The computer readable medium of claim 16, wherein the data relating to frame detail pixels is grabbed according to a predetermined order.

18. The computer readable medium of claim 16, wherein when data relating to all the frame detail pixels have been transferred over the data bus, the program further performs the steps comprising:

continuously monitoring the time remaining for operation on each current frame and, whenever remaining time permits, transferring over the data bus data relating to frame neighboring pixels, defined as pixels neighboring a group of pixels in which a skeleton pixel has been detected to have changed, but belonging to a group in which a skeleton pixel has been detected not to have changed.

19. The computer readable medium of claim 18, wherein the data relating to all the frame neighboring pixels is grabbed according to a predetermined order.

20. The computer readable medium of claim 18, wherein when data relating to all the frame neighboring pixels have been transferred over the data bus, the program further performs the steps comprising:

monitoring the time remaining for operation on each current frame and, whenever remaining time permits, transferring over the data bus data relating to frame remaining pixels, defined as pixels of the current frame which have not been grabbed yet.

21. The computer readable medium of claim 20, wherein the data relating to the frame remaining pixels is transferred over the data bus according to a pseudo-random order.

22. A grabbing computer algorithm for transferring video images over a data bus, the grabbing algorithm performing the steps of:

dividing each of a plurality of available video frames into groups of pixels and selecting one pixel, defined as a skeleton pixel, from each of the groups of pixels and adopting the selected pixels for each video frame so as to form a corresponding skeleton screen;

repeatedly transferring skeleton pixels of video frames over the data bus, and comparing skeleton pixels of skeleton screens of successive video frames to detect changed skeleton pixels;

continuously monitoring the time remaining for operation on each current frame and, whenever remaining time permits, transferring over the data bus data relating to frame detail pixels, defined as pixels belonging to a group in which a skeleton pixel has been detected to have changed, wherein when data relating to all the frame detail pixels have been transferred over the data bus, the algorithm further performs the steps comprising:

continuously monitoring the time remaining for operation on each current frame and, whenever remaining time permits, transferring over the data bus data relating to frame neighboring pixels, defined as pixels neighboring a group of pixels in which a skeleton pixel has been detected to have changed, but belonging to a group in which a skeleton pixel has been detected not to have changed.

23. A computer readable medium having a program stored therein, said program having directions to perform the steps comprising:

dividing each of a plurality of available video frames into groups of pixels and selecting one pixel, defined as a skeleton pixel, from each of the groups of pixels and adapting the selected pixels for each video frame so as to form a corresponding skeleton screen;

repeatedly transferring skeleton pixels of video frames over the data bus, and comparing skeleton pixels of skeleton screens of successive video frames to detect changed skeleton pixels; monitoring the time remaining for operation on each current frame and, when remaining time permits, transferring data relating to frame detail pixels, defined as pixels belonging to a group in which a skeleton pixel has been detected to have been changed, wherein when data relating to all the frame detail pixels have been transferred over the data bus, the program further performs the steps comprising:

continuously monitoring the time remaining for operation on each current frame and, whenever remaining time permits, transferring over the data bus data relating to frame neighboring pixels, defined as pixels neighboring a group of pixels in which a skeleton pixel has been detected to have changed, but belonging to a group in which a skeleton pixel has been detected not to have changed.

* * * * *